Oct. 1, 1963  W. D. WEBER ETAL  3,105,496
THRESHING CYLINDER
Filed Sept. 21, 1960  3 Sheets-Sheet 1

INVENTORS.
WILBERT D. WEBER &
BY ROBERT ASHTON

Wolfe, Hubbard, Voit & Osann
ATTORNEYS.

Oct. 1, 1963   W. D. WEBER ETAL   3,105,496
THRESHING CYLINDER
Filed Sept. 21, 1960   3 Sheets-Sheet 2

INVENTORS.
WILBERT D. WEBER &
ROBERT ASHTON
BY
Wolfe, Hubbard, Voit & Osann
ATTORNEYS.

INVENTORS.
WILBERT D. WEBER &
ROBERT ASHTON
BY
Wolfe, Hubbard, Voit + Osann
ATTORNEYS.

United States Patent Office 3,105,496
Patented Oct. 1, 1963

3,105,496
THRESHING CYLINDER
Wilbert D. Weber, Nashville, Ontario, and Robert Ashton, Toronto, Ontario, Canada, assignors to Massey-Ferguson Limited, Toronto, Ontario, Canada, a corporation of Canada
Filed Sept. 21, 1960, Ser. No. 57,457
3 Claims. (Cl. 130—27)

This invention relates generally to threshing machines and concerns more specifically a threshing cylinder construction particularly useful in combines.

The harvesting of different types of crops requires different forms of threshing cylinders for effective operation. For example, it is usual practice to employ a rasp bar type of cylinder for threshing grain crops, while a spring-fingered or tine cylinder is used for vine crops. Many agricultural regions produce crops of varying types, and it is common for combines operating in such areas to be provided with alternate threshing cylinders so that the proper cylinder can be employed for the particular crop being harvested.

The task of changing cylinders in a conventional combine is a difficult one. It is usually necessary to drive the keys, securing both the cylinder itself and the cylinder drive pulley or sprocket, from the cylinder supporting shaft. The shaft is then pulled laterally from the combine so as to release the cylinder, and the original cylinder is removed. The replacement cylinder is then held in position while the shaft is reinserted into the drive sprocket or pulley and through the replacement cylinder. Finally, the keys are driven back into place securing the assembly together.

It is the primary aim of the present invention to greatly facilitate the conversion of a threshing assembly for differing crops by providing a novel cylinder construction that readily permits the proper operating elements for a particular crop to be mounted in operating position.

An object of the invention is also to provide a cylinder construction of the above type that can be easily manipulated and which requires no special tools or techniques.

It is a further object of the invention to provide a cylinder construction as described above which does not sacrifice rigidity or strength for convertibility. Moreover, it is an object to provide such a cylinder construction that is light in weight.

Another important object is to provide a cylinder construction having the above characteristics that is economical to manufacture and which can be embodied in standard combine designs without appreciably adding to the cost of the combine.

Other objects and advantages of the invention will become apparent upon reading the following detailed description and upon reference to the drawings, in which.

While the invention will be described in connection with certain preferred embodiments, it will be understood that we do not intend to limit the invention to those embodiments. On the contrary, we intend to cover all alternatives, modifications and equivalents as may be included within the spirit and scope of the invention as defined by the appended claims.

Figure 1:
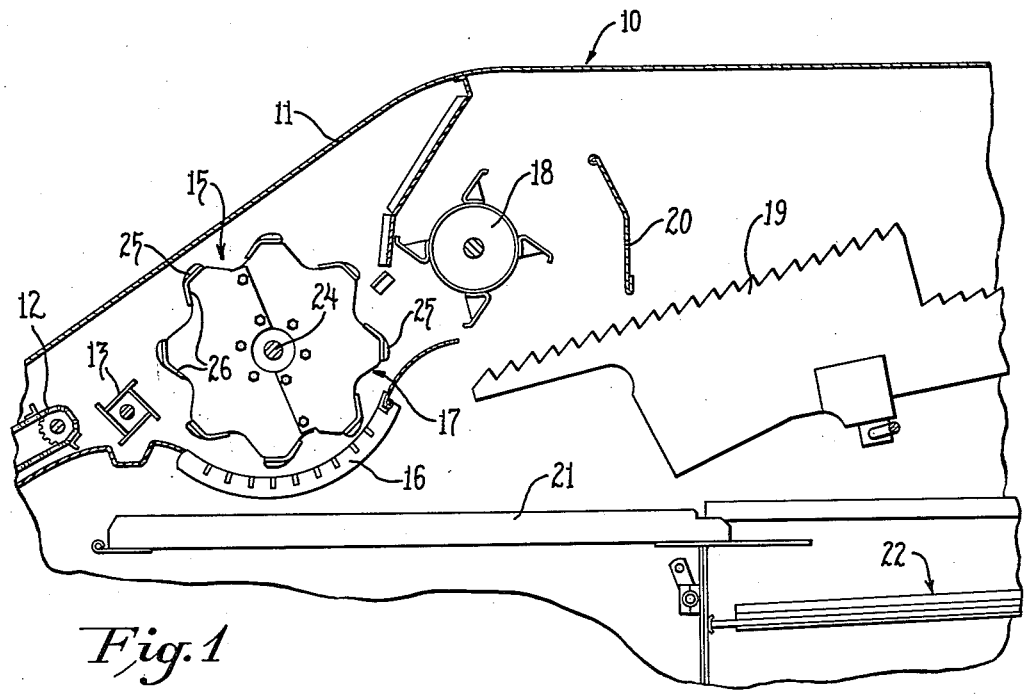
FIGURE 1 is a fragmentary section of the threshing region of a combine which includes a cylinder constructed in accordance with the present invention.
Figure 2:
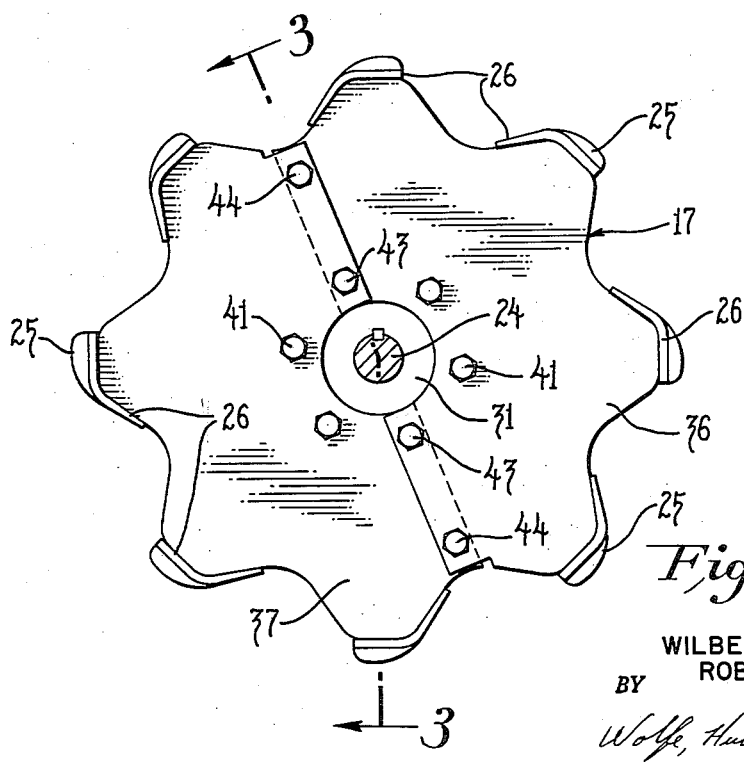
FIG. 2 is an enlarged elevation of the cylinder shown in FIG. 1.

Turning first to FIG. 1, there is shown a section of the threshing region of a combine 10 including a body or frame 11. An elevator 12 delivers the harvested material to a front beater 13 which, in turn, directs the harvested material to a threshing assembly 15 which includes a stationary concave 16 and a cooperating cylinder 17 that embodies the present invention.

At the rear of the threshing assembly 15, with respect to the direction of crop flow, is disposed a rear beater 18 and a shaker shoe assembly 19. A pivoted gate 20 is hung behind the rear beater 18. Beneath the threshing assembly 15 is a grain pan 21 which delivers the threshed and harvested material to a shaker shoe assembly 22.

Figure 3:
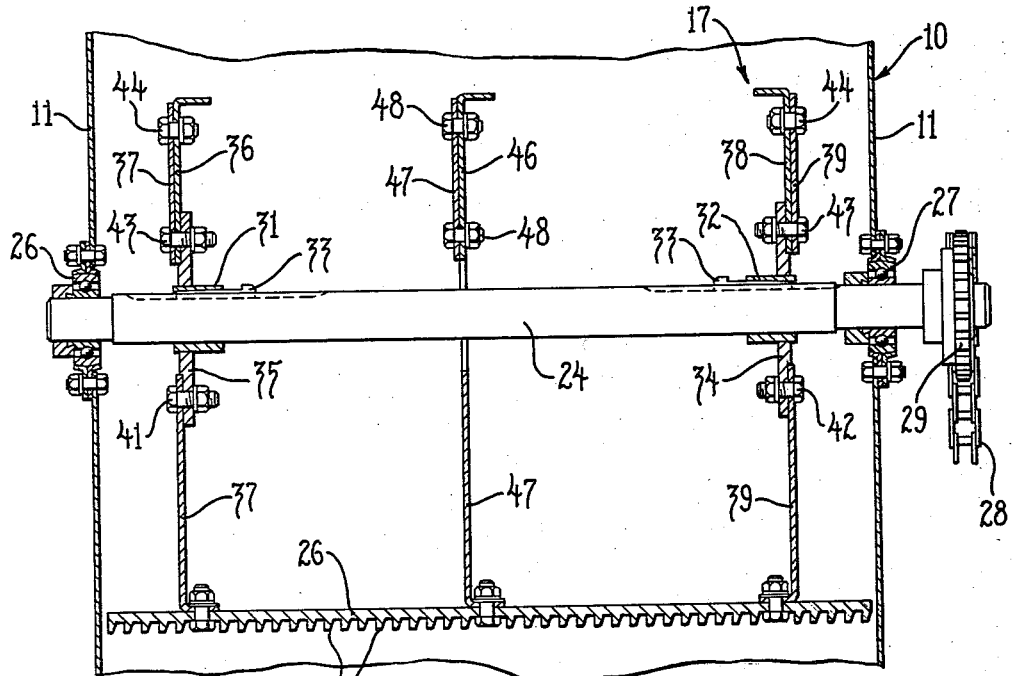
FIG. 3 is a fragmentary section taken approximately along the line 3—3 of FIG. 2.
Figure 4:
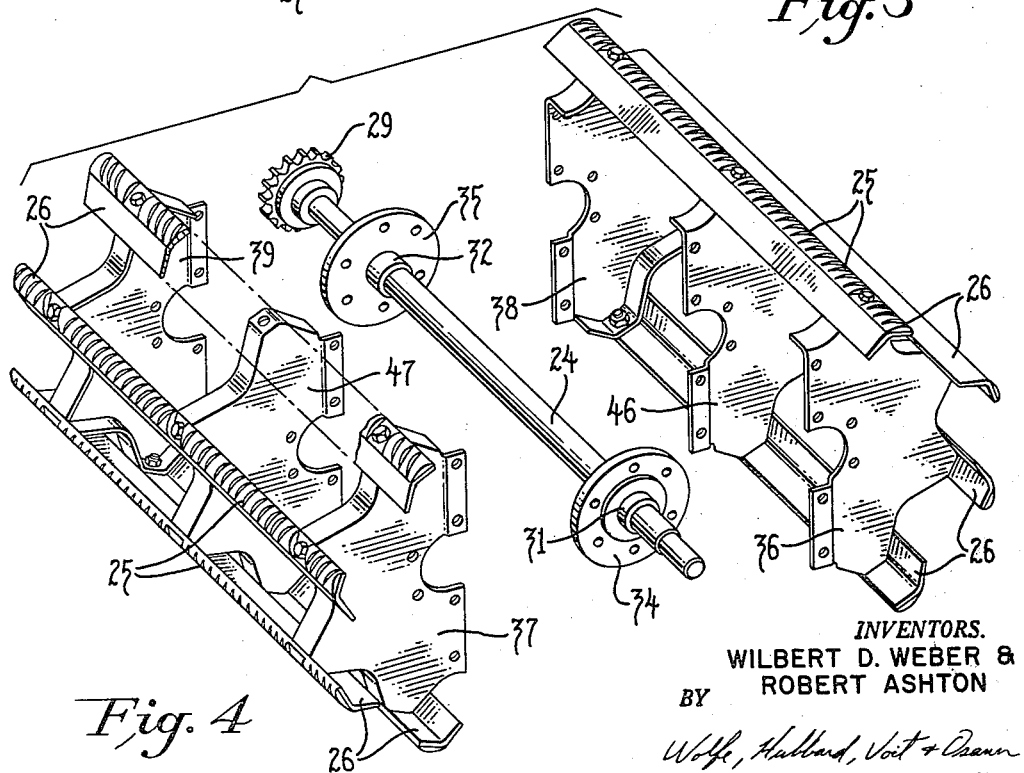
FIG. 4 is an exploded perspective view of the cylinder shown in FIG. 1.

The cylinder 17 is carried on a shaft 25 which is journalled in bearings 26, 27 that are mounted in the combine frame 11 (see FIG. 3). The cylinder is driven by a chain 28 through a sprocket 29 from the power plant of the combine.

In operation, the harvested crop material is propelled by the front beater 13 from the elevator 12 into the gap between the cylinder 17 and the concave 16. The threshing action results from the cooperation between the rapidly driven cylinder 17 and the stationary concave 16. A portion of the separated grain drops onto the pan 21 and the straw and remaining harvested products flow onto the straw walkers 19 for completion of the separating operation.

The cylinder 17 under discussion is of the rasp bar type primarily intended for threshing grain crops. Thus, the threshing elements of the cylinder take the form of a plurality of closely spaced ridges or teeth 25 carried on a plurality of ribs 26 which extend axially of the cylinder shaft 25. During the threshing operation, the grain is rubbed between the inner surface of the concave 16 and the teeth 25 on the threshing cylinder.

In accordance with the invention, the cylinder ribs 26, which carry the driven threshing elements, are rigidly secured in two groups to plates which are releasably mounted on hubs carried by the cylinder shaft 24. In the preferred embodiment, a pair of hubs 31 and 32 are firmly locked to the cylinder shaft 24 by keys 33. The hubs 31, 32 are provided with radially extending annular flanges 34, 35 respectively.

In the preferred construction, two pairs of generally arcuate, radially extending plates 36, 37 and 38, 39 are provided for carrying the two groups of ribs. The pair of plates 36, 37 is releasably secured to the flange 35 of the hub 31 by a plurality of bolts 41, while the pair of plates 38, 39 is releasably secured to the flange 35 of the hub 32 by a similar group of bolts 42.

Preferably, the opposite ends of each pair of plates 36, 37 and 38, 39 overlap and bolts 43 are passed through the overlapping portions and the adjacent flanges 35. To further secure the pairs of plates together, additional bolts 44 are passed through the overlying portions of the plates near their peripheries.

In the illustrated construction, the ribs 26 are divided into two groups with a first group of four ribs being rigidly secured to the plates 37 and 39 and a second group of four ribs being rigidly secured to the plates 36 and 38. The mounting of the ribs is such that they extend axially of the cylinder shaft 24, and the threshing elements, that is the teeth 25, define a generally cylindrical pattern disposed in cooperative relationship with the concave 16.

For added rigidity, an additional pair of generally arcuate, radially extending plates 46 and 47 are provided between the spaced hubs 31, 32 with the plate 46 being secured to one group of the ribs 26 and the plate 47 being secured to the other group of ribs. The adjacent ends of the plates 46, 47 overlap when the cylinder is in assembled relation and bolts 48 secure these plates together and thereby impart added rigidity to the cylinder construction.

Figure 5:
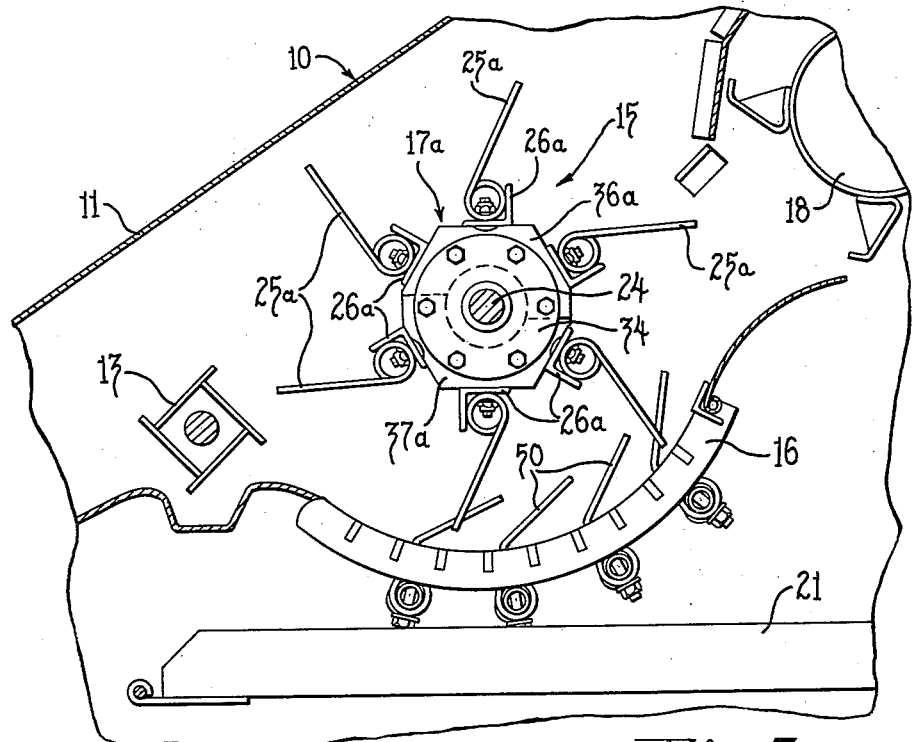
FIG. 5 is an enlarged view similar to FIG. 1 showing an alternate form of cylinder which also embodies the invention.
Figure 6:
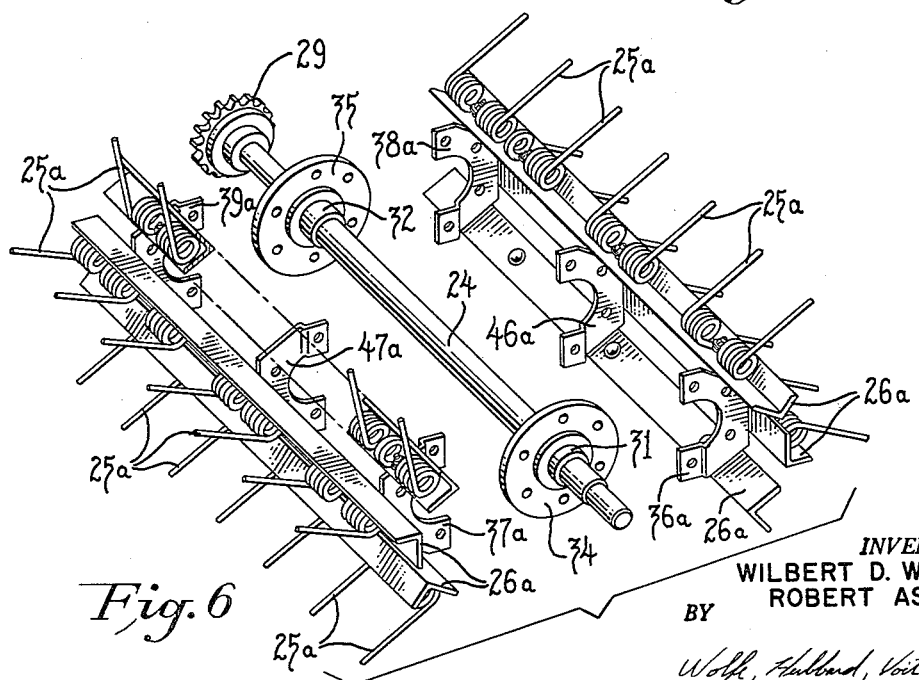
FIG. 6 is an exploded view of the cylinder shown in FIG. 5.

To convert the threshing assembly of the combine 10 from the handling of grain crops, the bolts 41–44 and 48 are removed and the two sections of the cylinder thus formed are lifted from the shaft 24. Alternate cylinder sections carrying the desired threshing elements are then fitted onto the hubs 31, 32 and bolted into place. For example, in FIGS. 5 and 6, there is shown a cylinder construction 17a for vine crops embodying the invention and mounted in the combine 10. In describing this alternate form of a cylinder construction, parts corresponding to those previously described have been given the same reference numeral with the distinguishing suffix "a" added.

For threshing vine crops, the cylinder 17a has threshing elements in the form of spring fingers 25a which are secured along the length of a plurality of ribs 26a. The ribs 26a are mounted axially with respect to the cylinder shaft 24 on pairs of arcuate plates 36a, 37a and 38a, 39a. The pairs of plates are generally arcuate in form and are provided with bolt holes so as to be releasably secured to the flanges 35 of the hubs 31, 32 in the same manner as the plates 36, 37 and 38, 39. The adjacent ends of the pairs of plates 36a, 37a and 38a, 39a overlap and bolts are fitted through the overlapping portions and the adjacent hub flange 35 so as to rigidify the assembly.

When mounted on the cylinder shaft 24, the cylinder 17a disposes its threshing elements, that is, the spring fingers 25a, in a generally cylindrical pattern positioned in cooperative relationship with respect to the cylinder concave 16. An additional set of plates 46a and 47a are rigidly secured to the ribs 26a between the hubs 31, 32 and are bolted together so as to rigidify the cylinder construction. To complete the conversion of the combine 10, a row of spring fingers 50 are mounted along the forward portion of the concave 16 to fit within the paths of movement of the fingers 25a.

It can now be seen that conversion of the threshing assembly 15 of the combine 10 for the efficient handling of varying crops can be accomplished simply and easily. For example, in converting from the rasp bar cylinder 17 to the spring finger cylinder 17a, the group of bolts holding the pairs of radially disposed plates 36 and 37, 38 and 39, and 46 and 47 are removed and the resulting sections of the cylinder 17 are simply lifted from the combine. The bolts can, of course, be handled with conventional tools. There is no necessity for releasing the shaft 24 from the drive sprocket 29 or the hubs 31, 32. With the sections of the cylinder 17 lifted from the combine, the corresponding sections of the cylinder 17a are bolted to the flanges 35 of the hubs 31 and 32. Since only half an entire cylinder assembly is being handled at one time, the operator is not required to lift and position a full cylinder assembly.

Those skilled in the art will appreciate that the cylinders 17 and 17a, constructed in accordance with the invention, are quite simple and economical in form so as to add very little to either the total weight or the cost of the combine 10. It will also be apparent that the invention is well suited for use in any standard threshing assembly.

We claim as our invention:

1. In a threshing assembly having a stationary threshing member, a threshing cylinder for cooperating with said member comprising, in combination, a shaft journalled in alinement with said member, a pair of hubs secured to said shaft, each of said hubs having radially extending flanges, a pair of generally arcuate, radially extending plates bolted to each hub flange, the opposite ends of each pair of plates being overlapped and having a bolt through the overlapped portions and the adjacent flange, and two groups of ribs extending axially of the shaft with one group of ribs being rigidly secured between plates in each of said pairs and the other group of ribs being rigidly secured between the other plates of said pairs, said ribs carrying threshing elements along their length with the elements defining a generally cylindrical pattern disposed in cooperative relationship with said threshing member.

2. In a threshing assembly having a stationary threshing member, a threshing cylinder for cooperating with said member comprising, in combination, a shaft journalled in alinement with said member, a pair of hubs secured to said shaft, each of said hubs having radially extending flanges, a pair of generally arcuate, radially extending plates releasably secured to each hub flange, two groups of ribs extending axially of the shaft with one group of ribs being rigidly secured between plates in each of said pairs and the other group of ribs being rigidly secured between the other plates of said pairs, said ribs carrying threshing elements along their length with the elements defining a generally cylindrical pattern disposed in cooperative relationship with said threshing member, and an additional pair of generally arcuate, radially extending plates releasably secured to one another at their opposite ends, one of said additional plates being rigidly secured to said first group of ribs and the other additional plate being rigidly secured to said second group of ribs.

3. A threshing cylinder comprising, in combination, a journalled shaft, a pair of hubs secured to said shaft, each of said hubs having radially extending flanges, a pair of generally arcuate, radially extending plates fastened to each hub flange, the opposite ends of each pair of plates being overlapped and having a fastening through the overlapped portions and the adjacent flange, two groups of ribs extending axially of the shaft with one group of ribs being rigidly secured between plates in each of said pairs and the other group of ribs being rigidly secured between the other plates of said pairs, said ribs carrying threshing elements along their length with the elements defining a generally cylindrical pattern, and an additional pair of generally arcuate, radially extending plates releasably secured to one another at their opposite ends, one of said additional plates being rigidly secured to said first group of ribs and the other additional plate being rigidly secured to said second group of ribs.

References Cited in the file of this patent

UNITED STATES PATENTS

| 2,283,402 | Welty | May 19, 1942 |
| 2,678,652 | Bryant | May 18, 1954 |